United States Patent [19]

Mitoh et al.

[11] Patent Number: 4,910,056
[45] Date of Patent: Mar. 20, 1990

[54] CENTER HUB HOLDER TAPE

[75] Inventors: Yasuo Mitoh; Takeshi Hamamoto; Mitsuo Kuramoto, all of Osaka, Japan

[73] Assignee: Nitto Denko Corporation, Osaka, Japan

[21] Appl. No.: 304,626

[22] Filed: Feb. 1, 1989

[30] Foreign Application Priority Data

Feb. 1, 1988 [JP] Japan .............................. 63-12470[U]

[51] Int. Cl.⁴ ............................. B32B 7/06; B32B 7/12
[52] U.S. Cl. ......................................... 428/42; 428/65; 428/137; 428/220; 428/906; 206/460; 206/813
[58] Field of Search ................... 428/42, 906, 137, 65, 428/220; 369/290; 206/460, 347, 346, 813

[56] References Cited

U.S. PATENT DOCUMENTS 2,501,465 3/1950 Caramanoff .......................... 369/290

Primary Examiner—Alexander S. Thomas
Attorney, Agent, or Firm—Sughrue, Mion, Zinn, Macpeak & Seas

[57] ABSTRACT

A center hub holder tape includes a generally non-stretchable carrier tape having a series of apertures formed therethrough and spaced at an equal interval from one another along the length of the carrier tape. A series of center hubs for use in a recording disc are carried by the carrier tape, with their tubular bodies removably inserted in the apertures in the carrier tape, respectively. An adhesive layer is interposed between one side of the carrier tape and a flange around the body of the center hub to adhesively bond them together. The adhesive layer is releaseably bonded to the one side of the carrier tape so that center hub can be removed from the carrier tape together with the adhesive layer.

7 Claims, 1 Drawing Sheet

CENTER HUB HOLDER TAPE

BACKGROUND OF THE INVENTION

1. Field of the Invention

This invention relates to a center hub holder tape holding a series of center hubs for use in a recording disc such as a magnetic disc and an optical disc.

2. Prior Art

Conventionally, in the manufacture of a magnetic disc or an optical disc, a center hub is attached relative to a center hole of a disc body by an adhesive applied to either a peripheral edge portion of the disc body around the center hole or a flange of the center hub. In such prior art, the following problems have been encountered: (1) uneven thickness of the adhesive layer due to inevitable irregularities in coating; (2) excessive care needed until the setting or curing of the coated adhesive; (3) additional treatment to deal with an excess adhesive squeezed out of the bonding area (4) inadequate bonding strength due to the starved adhesive; and (5) difficulty in detecting such inadequate bonding strength.

To overcome the above problems, another bonding method has been proposed in which adhesive rings are preformed, for example, by stamping, and are bonded onto a carrier tape at a predetermined interval, the carrier tape with the adhesive rings being wound into a roll. In the production line, the adhesive ring is applied to either the flange of the center hub or the peripheral edge portion around the center hole of the disc body to thereby bond the center hub to the disc body.

Generally, such adhesive rings are of a relative small size and therefore can not be affixed to the carried tape with a sufficient bonding strength. As a result, the adhesive rings are susceptible to peeling from the carrier tape, deformation and displacement out of position during the time when the roll-like carrier tape is moved or transported. This has affected the accuracy of positioning of the center hub relative to the disc body when assembling the recording disc, thus resulting in a very poor yield of good finish products.

SUMMARY OF THE INVENTION

It is therefore an object of this invention to provide a center hub holder tape holding a series of center hubs by which the center hub can be affixed to a body of a recording disc quite accurately when assembling the recording disc, thereby improving a yield of good finish products.

According to the present invention, there is provided a center hub holder tape comprising:

(a) a carrier tape having a series of apertures formed therethrough and spaced at an equal interval from one another along the length of the carrier tape, the carrier tape being generally free from stretching, and at least one side of the carrier tape having a low adhesive-bonding ability;

(b) a series of center hubs for use in a recording disc, the center hubs being carried by the carrier tape, each of the center hubs having a tubular body and a flange formed around an outer periphery of the body in facing relation to the one side of the carrier tape, and each the body being removably inserted in a respective one of the series of apertures in the carrier tape; and (c) adhesive layers each interposed between the one side of the carrier tape and a respective one of said flanges to adhesively bond them together, the adhesive layer being releaseably bonded to the one side of the carrier tape so that the center hub can be removed from the carrier tape together with the adhesive layer.

The adhesive layer is interposed between the carrier tape and the flange of the center hub, so that the adhesive layer is protected by the flange. Therefore, the adhesive layers are prevented from disengagement from the carrier tape, deformation and displacement out of position. As a result, when each center hub is removed from the carrier tape and is affixed to the recording disc such as an magnetic disc and an optical disc, a high accuracy of positioning of the center hub relative to the disc is achieved, which leads to a high yield of good finish products. Further, when storing the center hub holder tape, it can be formed into a roll or folded into a zigzag or corrugated shape, using a protective sheet wound or folded together with the center hub holder tape. Therefore, the center hubs can be continuously fed when assembling the discs, and this is advantageous to the automation of the production line.

DESCRIPTION OF THE PREFERRED EMBODIMENTS OF THE INVENTION

Figure 1:
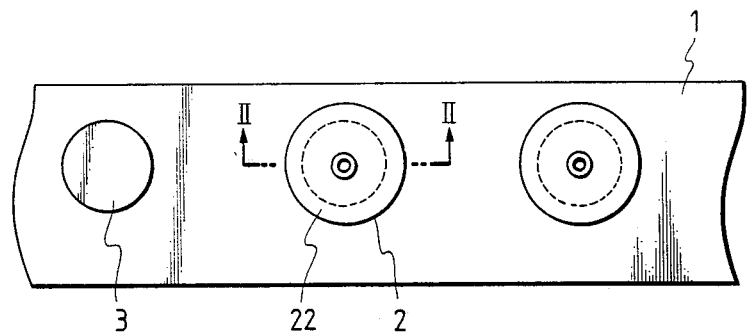
FIG. 1 is a top plan view of a portion of a center hub holder tape provided in accordance with the present invention.

The invention will now be described with reference to the drawings.

A center hub holder tape comprises a carrier tape 1 which is generally free from stretching, at least one side or face of the carrier tape 1 having a low adhesive-bonding ability. The carrier tape 1 is made of a material which has smooth surfaces and has either nonstretchability or low stretchability. Examples of such material include a biaxially-oriented plastic film of polyester, polypropylene or the lie, a laminate comprising a Kraft paper sheet and a polyolefin resin film laminated on at least one side of the sheet, and a resin-treated material comprising a substrate of a paper sheet, the above-mentioned plastic film or the above-mentioned laminate and a coating material of a polyvinyl N-octadecyl carbamate compound, a silicone compound or the like applied to at least one side of the substrate.

The carrier tape 1 has a series of apertures 3 formed therethrough and spaced at an equal interval along the length thereof. The center hub holder tape also includes a plurality of center hubs 2 each having a tubular or cylindrical body 21 and an outwardly-directed peripheral flange 22 formed around the body 21 at one end, the center hubs 2 being held by the carrier tape 1 with their bodies 21 removably inserted in the series of apertures 3, respectively. An adhesive layer 4 is interposed between one side or face of the carrier tape 1 and an inner face of the peripheral flange 22 of each center hub 2 facing the carrier tape 1 to adhesively bond the peripheral flange 22 to the carrier tape 1, thereby connecting the center hubs 2 to the carrier tape 1. For feeding purposes, a series of perforations may be provided in one lateral margin of the carrier tape 1. The adhesive layer 4 is annular, extends around the entire periphery of the body 21 of the center hub 1, and is substantially equal in size and shape to the flange 22 of the center hub 2.

For attaching the center hubs 2 to the carrier tape 1, an adhesive of the type which is pressure sensitive at room temperature is coated onto the inner face of the peripheral flange 22 of each center hub 2 to form the adhesive layer 4 thereon. Then, the center hub 2 is inserted into the aperture 3 to adhesively bond the flange 22 to the one side of the carrier tape 1 through the adhesive layer 4.

Another alternative is to apply such an adhesive to the entire face of the carrier tape 1 to form an adhesive layer thereon. Then, the outer surface of this adhesive layer is covered with suitable sealing means at regions or portions spaced from one another along the length of the carrier tape, and then the other portion of the adhesive layer not covered by such sealing means is removed to form the adhesive layers 4 of an annular shape. At this time, the apertures 3 are formed through the carrier tape 1. Then, each center hub 2 is inserted in the aperture 3 so that the peripheral flange 22 of the center hub 2 is adhesively bonded to the carrier tape 1 through the adhesive layer 4.

For attaching the center hub 2 to a disc-shaped body of a magnetic disc or an optical disc, the center hub 2 bonded to the carrier tape 1 through the adhesive layer 4 is removed therefrom. At this tie, the adhesive layer 4 is peeled from the one side of the carrier tape 1 and is carried by the peripheral flange 22 of the center hub, because the smooth surface of the carrier tape 1 has a low adhesive-bonding ability as described above, and the adhesive layer 4 is releaseably bonded to tee one side of the carrier tape 1. In other words, the strength of bonding between the adhesive layer 4 and the flange 22 is higher than the strength of bonding between the adhesive layer 4 and the one side of the carrier tape 1. Then, the center hub 2 is adhesively bonded to the body of the disc through the adhesive layer 4.

The adhesive layer 4 can be either of an acrylic adhesive or a rubber adhesive. The acrylic adhesive is preferred. The thickness of the adhesive layer 4 is 5 to 300 μm, and preferably 10 to 150 μm. In order to provide a sufficient strength of bonding between the center hub 2 and the disc body and to withstand a rotational torque exerted on the disc when the disc is driven for rotation, it is preferred that the adhesive layer 4 should have a modulus of elasticity of between 1.1 kg/cm$^2$ and 20 kg/cm$^2$.

Figure 2:
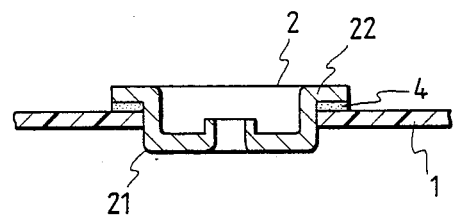
FIG. 2 is an enlarged, cross-sectional view taken along the line II—II of FIG. 1.
Figure 3:
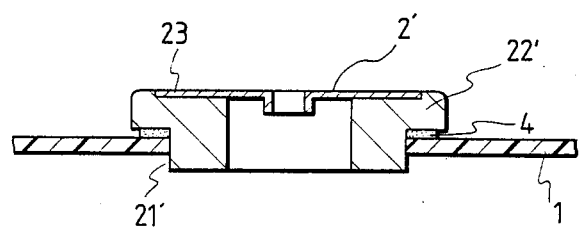
FIG. 3 is a view similar to FIG. 2 but showing a modified center hub holder tape.

FIG. 3 shows a modified center hub holder tape which differs from the center hub holder tape of FIGS. 1 and 2 only in that there is employed modified center hubs 2'having a tubular body 21'with opposite open ends, a peripheral flange 22'and an disc-shaped plate 23 secured to an outer surface of the flange 22'.

As described above, in the center hub holder tapes according to the present invention, the adhesive layer 4 is interposed between the carrier tape 1 and the peripheral flange 22, 22'of the center hub 2, 2', so that the adhesive layer 4 is protected by the flange. Therefore, the adhesive layers are prevented from disengagement from the carrier tape, deformation and displacement out of position. As a result, when each center hub is removed from the carrier tape and is affixed to a magnetic disc or an optical disc, a high accuracy of positioning of the center hub relative to the disc is achieved, which leads to a high yield of good finish products. Further, when storing the center hub holder tape, it can be formed into a roll or folded into a zigzag or corrugated shape, using a protective sheet wound or folded together with the center hub holder tape. Therefore, the center hubs can be fed continuously when assembling the discs, and this is advantageous to the automation of the production line.

What is claimed is:

1. A center hub holder tape comprising:
  (a) a carrier tape having a series of apertures formed therethrough and spaced at an equal interval from one another along the length of said carrier tape, said carrier tape being generally free from stretching, and at least one side of said carrier tape having a low adhesive-bonding ability;
  (b) a series of center hubs for use in a recording disc, said center hubs being carried by said carrier tape, each of said center hubs having a tubular body and a flange formed around an outer periphery of said body in facing relation to the one side of said carrier tape, and each said body being removably inserted in a respective one of said series of apertures in said carrier tape; and
  (c) adhesive layers each interposed between the one side of said carrier tape and a respective one of said flanges to adhesively bond them together, said adhesive layer being releaseably bonded to the one side of said carrier tape so that said center hub can be removed from said carrier tape together with said adhesive layer.

2. A center hub holder tape according to claim 1, in which said adhesive layer is annular, extends around the entire periphery of said body of said center hub, an is substantially equal in size and shape to said flange of said center hub.

3. A center hub holder tape according to claim 1, in which said adhesive layer comprises one of an acrylic adhesive and a rubber adhesive.

4. A center hub holder tape according to claim 1, in which the thickness of said adhesive layer is 5 to 300 μm.

5. A center hub holder tape according to claim 4, in which the thickness of said adhesive layer is 10 to 150 μm.

6. A center hub holder tape according to claim 1, in which said adhesive layer has a modulus of elasticity of between 1.1 kg/cm$^2$ and 20 kg/cm$^2$.

7. A center hub holder tape according to claim 1, in which said carrier tape is made of a material selected from the group consisting of a biaxially-oriented plastic film, a laminate comprising a Kraft paper sheet and a polyolefin resin film laminated on at least one side of the sheet, and a resin-treated material comprising a substrate of one of a paper sheet, said plastic film and said laminate and a coating material of one of a polyvinyl N-octadecyl carbamate compound and a silicone compound applied to at least one side of the substrate.

* * * * *